June 12, 1934.  W. A. ANGLEMYER  1,962,472
EXTENSION VALVE
Filed Dec. 5, 1932

Inventor
WILLIARD A. ANGLEMYER
By Owen H. Spencer
Attorney

Patented June 12, 1934

1,962,472

UNITED STATES PATENT OFFICE 1,962,472

EXTENSION VALVE

Williard A. Anglemyer, Indianapolis, Ind.

Application December 5, 1932, Serial No. 645,779

1 Claim. (Cl. 152—12)

My invention is a self sealing air valve which is automatically held closed by a spring and air pressure within the container into which air has been directed through the valve, the opening movement of the valve being usually initiated by contact with parts of a conventional external conduit connection, the open position being also maintained by the movement of the air introduced through the valve; and the invention pertains especially to auxiliary valve attachments to ordinary valve stems embodied with pneumatic vehicle tires; and the invention consists substantially in the construction, combination and arrangement of elements hereinafter pointed out and recited more particularly in the claims.

It is a primary object of the invention to provide a valve and tire valve stem cap combined, of comparatively short and compact construction, so that by the installation of same the valve stem structure will not be thus increased in length to such an extent that the communication of conventional air supplying means therewith will be hampered by interference with parts of the vehicle wheel, and will not be increased in length to such an extent as to expose the thus increased stem structure to contact with objects or structures encountered in driving or parking the vehicle.

It is also a primary object to provide a valve and valve cap combined, which embodies means for instant connection with ordinary hand tire pumps such as are carried along with the vehicle, as well as with ordinary air hose means such as are regularly accessible at gasoline filling stations and like places.

The above and other objects are attained by the structure illustrated in the accompanying drawing in which.

Figure 1:
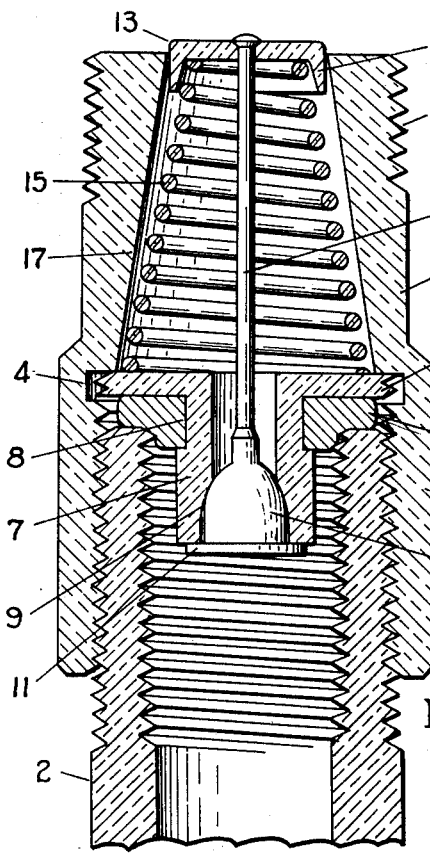
Figure 1 is a cross sectional view of the invention, and of a portion of a typical vehicle tire valve stem to which it is attached, the valve elements being in closed position.

Referring to Fig. 1, the numeral 1 designates the cylindrical body of the device which is threaded over the standard pneumatic tire valve stem, 2. Spaced from the end of said valve stem the gasket seat 3 is freely positioned in the recess 4 of the body 1, said recess being in the nature of an internal groove concentric with said body as a whole and said gasket seat being a circular plate like part. The washer type gasket 5, is disposed between said gasket seat and the end of said valve stem, by which arrangement it will be understood that when tightening the body 1, onto the stem 2, the gasket 5, and gasket seat 3, are held relatively fixed by contact of said gasket with the end of the valve stem, the more remote side of the recess 4 of the said body, sliding on said gasket seat, as said body turns in screwing same on the valve stem. From the foregoing, it will be obvious that the gasket 5 is compressed in position between said seat and said valve stem by simple clamping movement of said seat toward said stem, whereas devices of this class heretofore used confine such gasket to the stem by a seat integral with the part of the device which engages the threads of the stem, by which undesirable arrangement the gasket is thus distorted against the stem by rotation of the seat and thus injured and eventually destroyed, whereas with the present device the gasket is not submitted to any such scrubbing action.

A concentric sleeve 7, is formed on the gasket seat 3, and extends inwardly therefrom through the gasket 5, which is snugly disposed in the neck like recess 8, of said sleeve. Said sleeve is hollow and the interior surface of the inner end thereof flares outwardly, being somewhat inversely in shape to the end of an egg, and thus forms a seat 9 for the correspondingly shaped valve element 10, which, being of blunter formation normally contacts said seat in tangent relation thereto as considered meridionally and contacting said seat in a latitudinal circle. The valve element 10 is provided at its inner extremity with the flange 11, which normally seats against the extreme inner end of the sleeve 7 and thus forms an air seal simultaneously with the seating of said valve element with the valve seat 9. A valve shank 12 is secured to the upper end of and extends outwardly from the valve element 10. The outer end of said valve shank is conveniently clinched through the disc like valve closure 13. A cylindrical flange 14 extends inwardly from the edge of said valve closure, and the smaller and outer end of the conical coil spring 15, nests within said flange, said spring being tensioned between said closure and the gasket seat 3. By this arrangement it will be understood that said spring thus serves to normally hold the valve element 10 in contact with the valve seat 9, and the flange 11, against the end of the sleeve 7, through the valve shank 12.

A cylindrical continuation 16 of the body 1, extends outwardly therefrom, and the interior of said continuation closely encloses the conical spring 15 and conforms to the shape thereof, the inner surface 17 of said continuation being inverted-bucket shaped.

Figure 5:
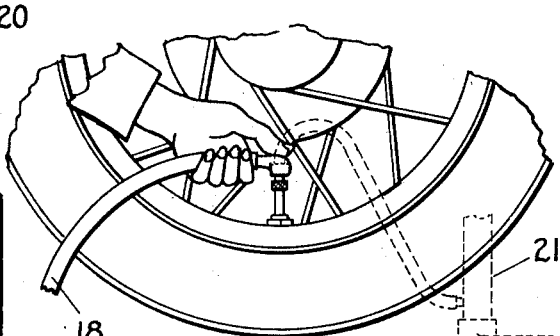
Fig. 5 shows the invention embodied with a wire spoke vehicle wheel, and the method of applying a filling station air hose for the introduction of air, the method of likewise using a hand pump as shown in Fig. 4, being indicated by dotted lines.

In applying a filling station air hose 18 to the device for supplying air to the vehicle tire as shown in Fig. 5, the valve trip 19 of the hose connection 18, strikes the valve closure 13, forcing same downwardly, and thus pushing the valve element 10 and flange 11, from seated position, by which the passage of the inwardly coming air is permitted through the body continuation 16, the gasket seat 3, and sleeve 7, around the valve shank 12; and the valve closure 13, being thus moved to a diametrically larger interior region of said continuation, passage of air is permitted between said closure and the interior surface 17 of said continuation as indicated by the arrows 20.

Figure 3:
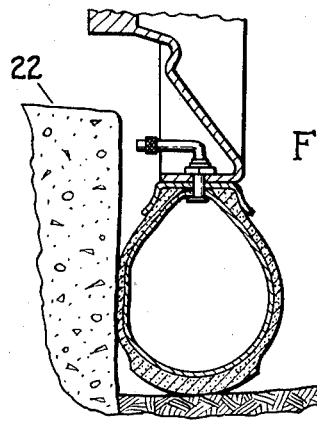
Fig. 3 illustrates the device as applied to a disc type vehicle wheel to illustrate the advantage of the comparatively short dimensions of the device for clearing structures or objects with which the vehicle wheel may come in contact.
Figure 2:
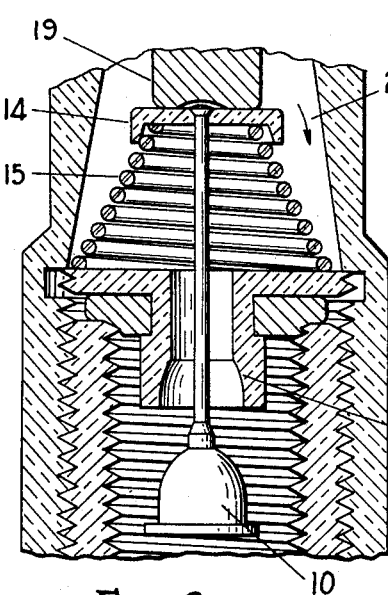
Fig. 2 is a fragmentary cross sectional view as of a portion of Fig. 1, showing the valve elements in open position.

By using a spring 15, of conical type, it will be observed by referring to Fig. 2, that said spring may be compressed sufficiently to permit the shifting of the valve element 10, and flange 11, considerable distance from the sleeve 7, without bringing together the turns of said spring, by which feature the incoming air travels between said turns at a rate permitted by the wide open position of said valve element. It will therefore be understood that by using a conical spring a comparatively shorter spring is employed in operating said valve element, and that a device is thus provided which as a whole is comparatively short, giving great advantage in avoiding interference with the wheel parts when a conventional air hose 18, or hand pump 21 is applied; as indicated in Fig. 5. It will also be understood that when the device is attached to a valve stem of the type indicated in Fig. 3, the device will safely clear objects within close proximity of which the vehicle wheel comes, such as the curb stone 22, or large pebbles in the roadway.

Figure 4:
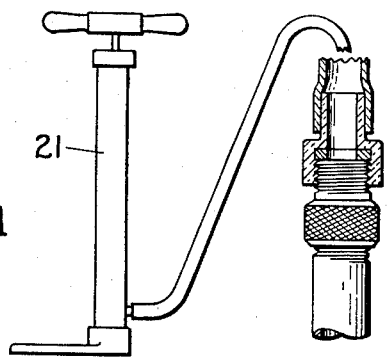
Fig. 4 illustrates the use of an ordinary manually operated air pump in connection with the device.

The body continuation 16, is provided with external threads 23, which extend entirely to the outer end thereof, said threads being provided for engaging the device with a conventional hand pump, illustrated in Fig. 4.

The periphery of the gasket seat 3, is provided with threads substantially parallel with the threads within the body 1 which engage the external threads of the valve stem 2, and the said gasket seat is assembled by threading same through the inner portion of said body into the recess 4, and is there retained by its own threads in slidable relation with said recess.

In manufacturing the device, the valve gasket seat 3, the gasket 5, the valve seat 9, the valve element 10, the valve shank 15, the conical spring 15, and the closure 13, are combined as an assembled unit which is properly installed within the body 1, by screwing said gasket seat through the valve stem engaging threads of said body, into the recess 4.

The pitch of the valve stem engaging threads are cut a slightly different pitch to that of the threads on a conventional tire valve stem, by which arrangement the body 1, becomes rigidly tight on such stem when the body is entirely threaded to same, thus preventing the loss or easy removal of the device.

The invention claimed is:

A tire valve stem connection having threads which serve to engage the exterior threads of a conventional tire valve stem, an interior circular groove formed within said connection at the inner termination of the connection threads, and a freely disposed gasket seat engaged at its periphery by said recess, the peripherial edge of said gasket seat forming threads substantially parallel with the connection threads by which said seat is screwed into place through said connection threads into said recess.

WILLIARD A. ANGLEMYER.